United States Patent
Tien et al.

(10) Patent No.: US 9,641,212 B1
(45) Date of Patent: May 2, 2017

(54) PROTECTIVE SHELL WITH SUPPORTING FUNCTION

(71) Applicants: Fu Tai Hua Industry (Shenzhen) Co., Ltd., Shenzhen (CN); HON HAI PRECISION INDUSTRY CO., LTD., New Taipei (TW)

(72) Inventors: Li-Wen Tien, New Taipei (TW); Chang-Xue Lei, Shenzhen (CN); Lei Wang, Shenzhen (CN)

(73) Assignees: Fu Tai Hua Industry (Shenzhen) Co., Ltd., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 15/194,594

(22) Filed: Jun. 28, 2016

(30) Foreign Application Priority Data

May 23, 2016 (CN) .......................... 2016 1 0343990

(51) Int. Cl.

| | |
|---|---|
| *H04M 1/00* | (2006.01) |
| *H04M 1/02* | (2006.01) |
| *H04B 1/38* | (2015.01) |
| *H04B 1/3888* | (2015.01) |
| *A45C 11/00* | (2006.01) |
| *A45F 5/00* | (2006.01) |

(52) U.S. Cl.
CPC ............ *H04B 1/3888* (2013.01); *A45C 11/00* (2013.01); *A45F 5/00* (2013.01); *A45C 2011/002* (2013.01); *A45C 2011/003* (2013.01); *A45C 2200/15* (2013.01)

(58) Field of Classification Search
CPC .. H04B 1/3888; H04M 1/0279; H04M 1/185; H04M 1/0214; H04M 1/00; H04M 1/02
See application file for complete search history.

(56) References Cited

U.S. PATENT DOCUMENTS

| | | | |
|---|---|---|---|
| 8,483,786 B2 * | 7/2013 | Ramies ..................... | B67B 7/16 455/550.1 |
| 8,634,887 B2 * | 1/2014 | Hu ......................... | G06F 1/1628 455/575.8 |
| 8,640,868 B2 * | 2/2014 | O'Dowd ............... | G06F 1/1628 206/320 |
| 8,644,895 B2 * | 2/2014 | Heywood ............ | H04B 1/3888 455/557 |
| 8,675,862 B1 * | 3/2014 | Lin ......................... | H04M 1/04 379/437 |

(Continued)

*Primary Examiner* — Pablo Tran
(74) *Attorney, Agent, or Firm* — Steven Reiss (57) ABSTRACT

A protective shell includes a shell body and support elements. The shell body covers an electronic device and includes a space for receiving the support elements. The support elements include a first support arm and a second support arm. The second support arm includes a first free end rotatably received in the receiving space and a second free end. The first support arm includes a third receiving space, a first end and a second end. The third receiving space can receive the second free end. The first end is slidably received in the second receiving space. The second end can be pulled out of the second receiving space toward outside of the shell body. An angle of the support element given to the shell body is adjustable because of the articulation between the first support arm and a second support arm.

20 Claims, 6 Drawing Sheets

(56) References Cited

U.S. PATENT DOCUMENTS

| | | | | |
|---|---|---|---|---|
| 8,958,857 B1* | 2/2015 | Kennard | ............... | A45C 11/00 |
| | | | | 361/679.02 |
| 8,977,328 B2* | 3/2015 | Cheng | ............... | H04B 1/3888 |
| | | | | 455/347 |
| 9,004,275 B2* | 4/2015 | Lee | ............... | A45C 11/00 |
| | | | | 206/320 |
| 9,014,766 B2* | 4/2015 | Hu | ............... | H04M 1/026 |
| | | | | 361/752 |
| 9,020,428 B2* | 4/2015 | Meunier | ............... | H04N 5/23229 |
| | | | | 455/41.1 |
| 9,026,187 B2* | 5/2015 | Huang | ............... | H05K 5/0086 |
| | | | | 455/41.1 |
| 9,031,623 B2* | 5/2015 | Yoo | ............... | H04B 1/3888 |
| | | | | 361/679.3 |
| 9,042,950 B1* | 5/2015 | Oh | ............... | H04B 1/3888 |
| | | | | 455/575.8 |

* cited by examiner

PROTECTIVE SHELL WITH SUPPORTING FUNCTION

CROSS-REFERENCE TO RELATED APPLICATIONS

This application claims priority to Chinese Patent Application No. 201610343990.8 filed on May 23, 2016, the contents of which are incorporated by reference herein.

FIELD

The subject matter herein generally relates to protective shells, and more particularly to, a protective shell with a function for supporting an electronic device it protects.

BACKGROUND

Electronic devices often have protective shells. Protective shells are employed by electronic devices for protection against being scratched. However, such protective shells are too thin and lightweight for any other function.

BRIEF DESCRIPTION OF THE DRAWINGS

Implementations of the present technology will now be described, by way of example only, with reference to the attached figures, wherein.

DETAILED DESCRIPTION

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

The present disclosure, including the accompanying drawings, is illustrated by way of examples and not by way of limitation. Several definitions that apply throughout this disclosure will now be presented. It should be noted that references to "an" or "one" embodiment in this disclosure are not necessarily to the same embodiment, and such references mean "at least one."

Furthermore, the term "coupled" is defined as connected, whether directly or indirectly through intervening components, and is not necessarily limited to physical connections. The connection can be such that the objects are permanently connected or releasably connected. The term "outside" refers to a region that is beyond the outermost confines of a physical object. The term "inside" indicates that at least a gap in of a region is partially contained within a boundary formed by the object. The term "substantially" is defined to be essentially conforming to the particular dimension, shape, or other feature that the term modifies, such that the component need not be exact. For example, "substantially cylindrical" means that the object resembles a cylinder, but can have one or more deviations from a true cylinder. The term "comprising," when utilized, means "including, but not necessarily limited to"; it specifically indicates open-ended inclusion or membership in the so-described combination, group, series and the like.

The present disclosure is described in relation to a protective shell with a function for supporting an electronic device.

Figure 1:
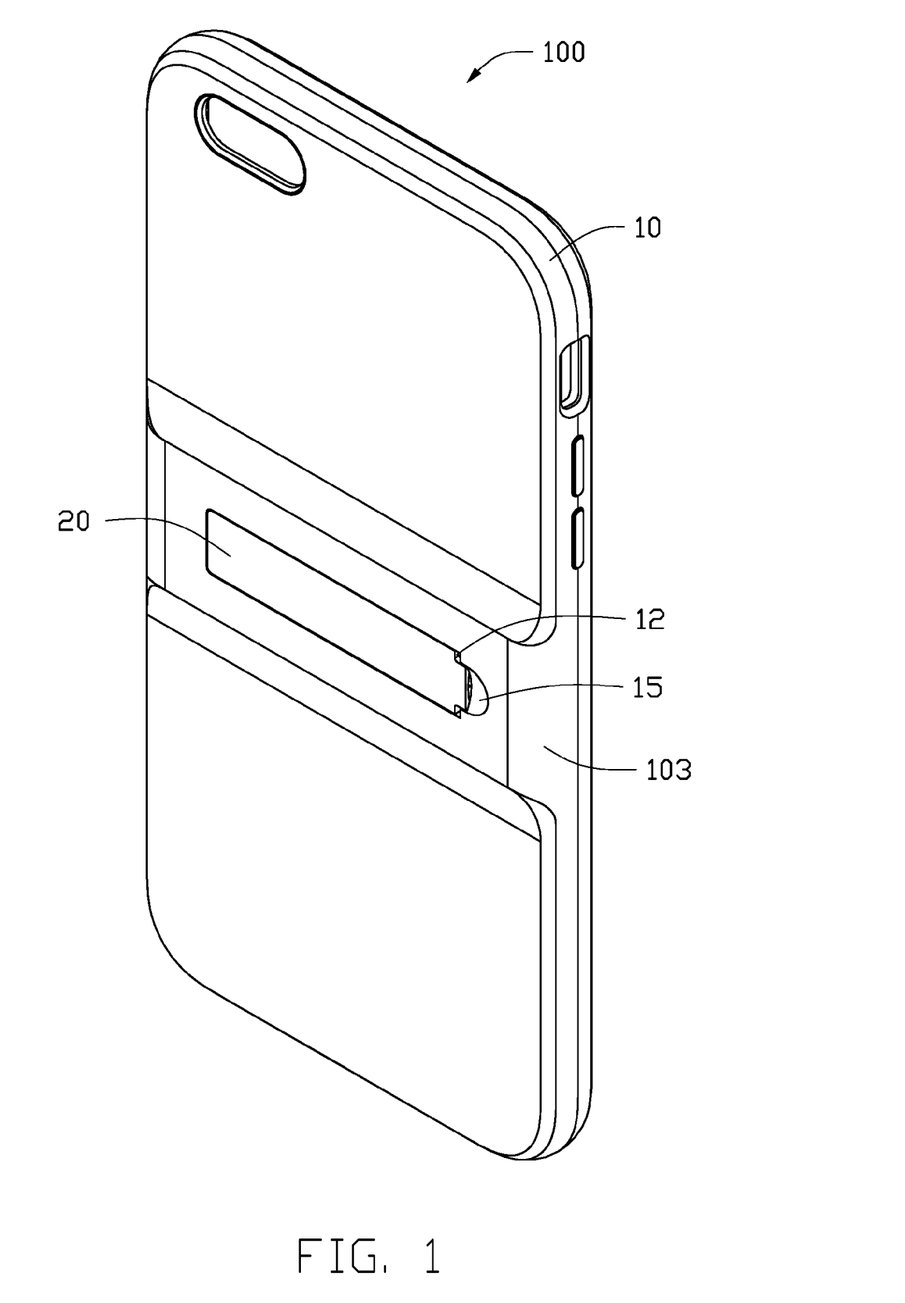
FIG. 1 is a diagrammatic view of one embodiment of a protective shell.
Figure 2:
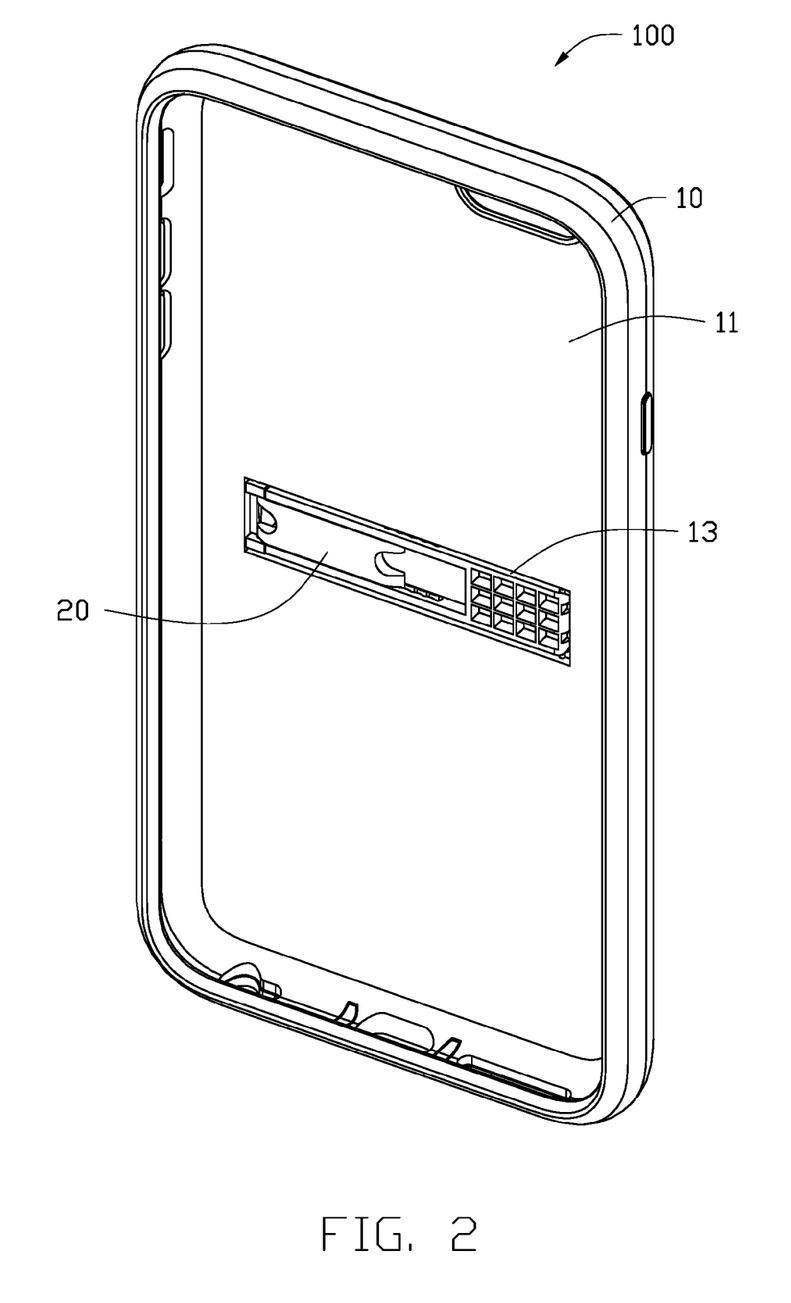
FIG. 2 is another perspective diagrammatic view of the protective shell of FIG. 1.

FIGS. 1-2 illustrate the protective shell 100. The protective shell 100 includes a shell body 10 and a support element 20. The support element 20 is arranged on the shell body 10. In the embodiment, the protective shell 100 can receive and provide protection to an electronic device (not shown) such as a smart phone, a tablet computer, and further can support the electronic device received in the protective shell 100 to make the electronic device free-standing.

The shell body 10 includes a first receiving space 11 and a second receiving space 12. The first receiving space 11 can receive an electronic device protected by the protective shell 100. The second receiving space 12 can receive the support element 20. The size and shape of the first receiving space 11 correspond to those of the electronic device. In the embodiment, the second receiving space 12 is formed on a bottom board 103 of the shell body 10 and faces outside of the protective shell 100. The second receiving space 12 is rectangular.

Figure 3:
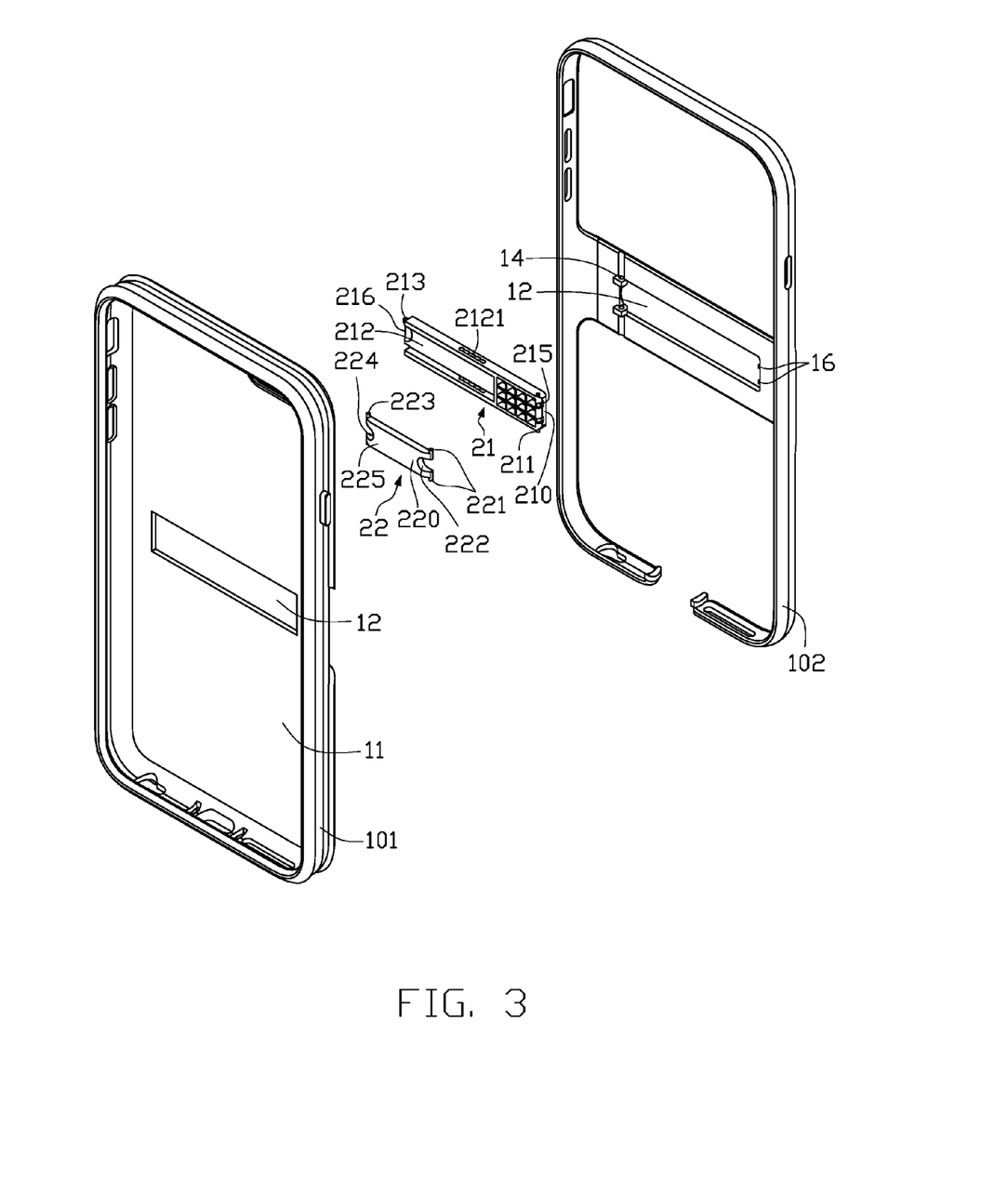
FIG. 3 is an exploded, isometric view of the protective shell in FIG. 2.

FIG. 3 shows an exploded drawing of the protective shell 100. The shell body 10 includes an inner body 101 and an outer body 102. The outer body 102 can partially cover the inner body 101. The inner body 101 is made from an elastic material, such as thermoplastic polyurethanes (TPU), thermoplastic elastomer (TPE), polypropylene (PP), and so on. Therefore, the inner body 101 can cushion the electronic device enclosed by the shell body 10 against impacts. The outer body 102 is made from a non-elastic material, such as metals or polycarbonate plastic. Thereby, the outer body 102 is substantially rigid, and the shape of the outer body 102 always remains the same. In the embodiment, a structure of the outer body 102 is hollow, as shown in FIG. 3, a bottom body of the outer body 102 is H shaped. The support element 20 can be folded to be received in the second receiving space 12, and can be unfolded to be placed outside of the second receiving space 12. When the support element 20 is placed outside of the second receiving space 12, the support element 20 can support the electronic device enclosed by the protective shell 100.

The support element 20 includes a first support arm 21 and a second support arm 22.

The first support arm 21 includes a first end 210 and a second end 216. The first end 210 is slidably received in the second receiving space 12. The second end 216 can be pulled out of the second receiving space 12 toward the outside of the shell body 10 while the first end 210 slides in the second receiving space 12. An inner surface of the first end 210 is square-shaped and concave. In an alternative embodiment, the inner surface of the first end 210 can be other shape, such as smooth and flat.

In the embodiment, the first end 210 includes two sliders 211. Each slider 211 projects from a sidewall of the two opposite sidewalls of the first end 210. The second receiving space 12 includes two slide grooves 13 (shown in FIG. 4) corresponding to the two sliders 211. The sliders 211 can be slidably received in the slide grooves 13.

In the embodiment, the second receiving space 12 is not only located in the outer body 102 of the shell body 10, but also in the inner body 101 of the shell body 10. That is, the second receiving space 12 passes through the outer body 102 and the inner body 101 of the shell body 10. The slide grooves 13 are formed on the inner body 101 of the shell body 10.

In an alternative embodiment, the second receiving space 12 is only formed in the outer body 102 of the shell body 10. The slide grooves 13 are formed on the outer body 102 of the shell body 10.

In other embodiments, the slide grooves 13 are formed between the outer body 102 and the inner body 101 of the shell body 10. For example, in an embodiment, a gap can be created in a sidewall of the second receiving space 12, where the inner body 101 connects to the outer body 102. The two gaps can thus constitute the slide grooves 13. In an alternative embodiment, a width of the second receiving space 12 located in the inner body 101 is greater than that of the second receiving space 12 located in the outer body 102, thus forming a stepped surface at the place where the inner body 101 connects to the outer body 102. The slider 211 can slide on the stepped surface.

Referring to FIG. 1, the shell body 10 includes a concave portion 15. The concave portion 15 connects to the second receiving space 12 and makes it convenient for user to pull the first support arm 21 of the support element 20 out of the second receiving space 12. In the embodiment, the concave portion 15 is semicircular and is located at the second end 216 of the first support arm 21. The second end 216 of the first support arm 21 is hollow, making it easier to pull the second end 216 of the first support arm 21 out from the shell body 10.

Figure 6:
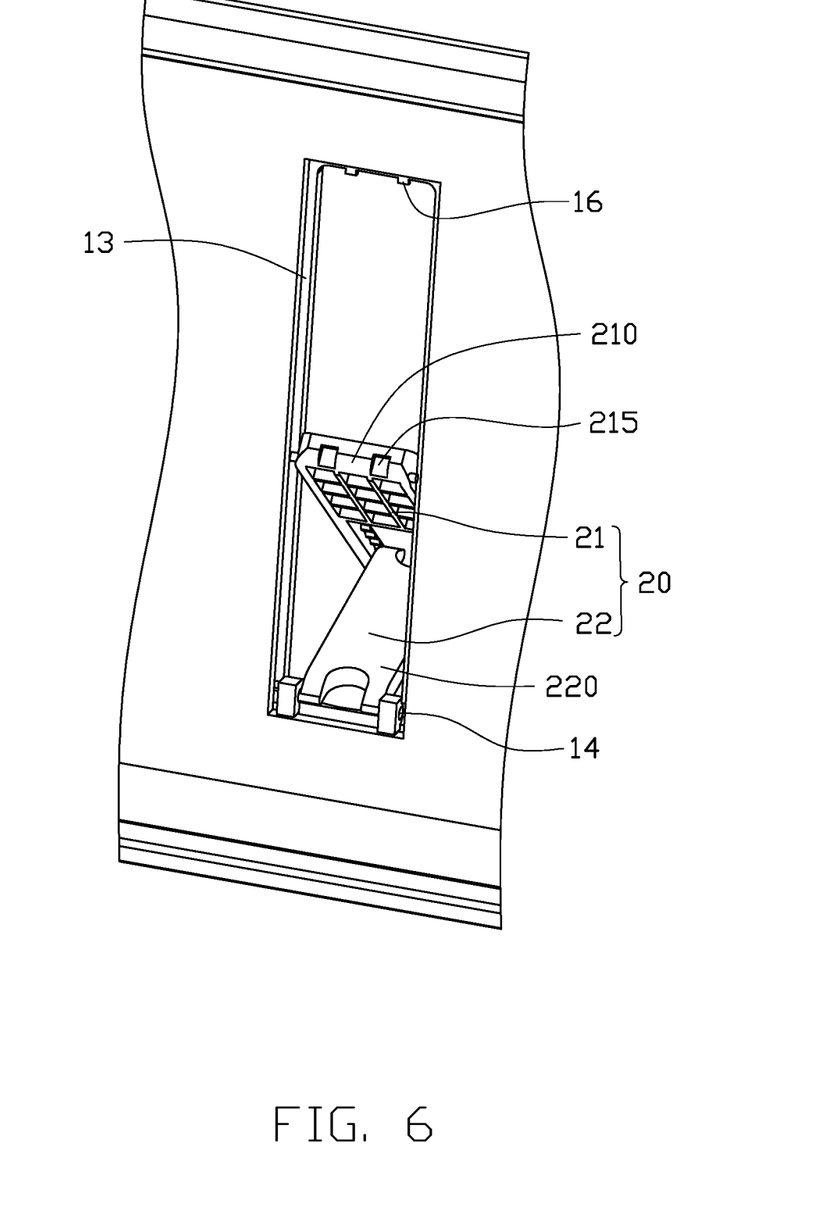
FIG. 6 is another perspective diagrammatic view of the protective shell in FIG. 5.

The second support arm 22 includes a first free end 220 and a second free end 225. The second free end 225 can be rotatably received in the second receiving space 12, as shown in FIG. 6. Each sidewall of the second free end 225 includes a rotation element 223. In one embodiment, the rotation elements 223 on sidewalls of the second free end 225 of the second support arm 22 are opposite each other. The second receiving space 12 includes two receiving holes 14 (shown in FIG. 6) for receiving the two rotation elements 223. That is, the rotation elements 223 are rotatably received in the receiving holes 14.

Figure 5:
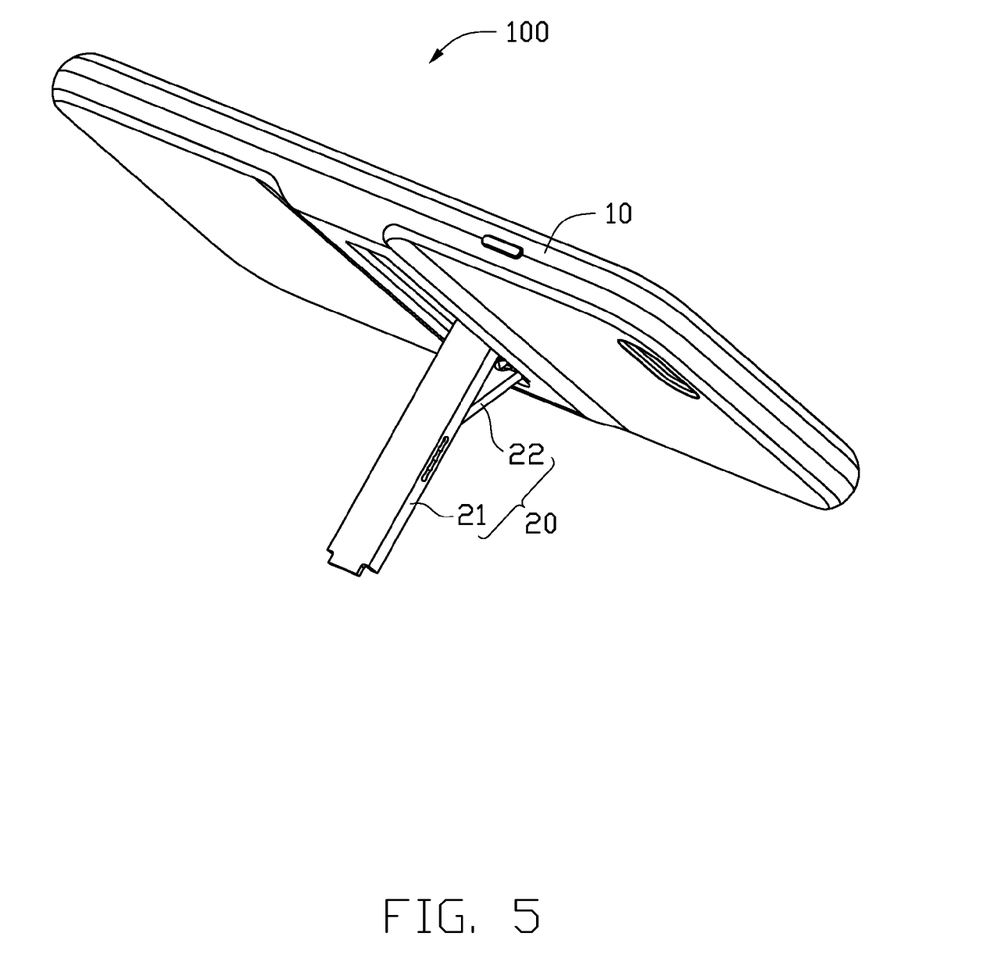
FIG. 5 is a diagrammatic view of the protective shell in a second usage state with a second support angle.

The first support arm 21 defines a third receiving space 212 for receiving the second support arm 22. As shown in FIGS. 5 and 6, the first free end 220 can be slidably received in the third receiving space 212. The first free end 220 of the second support arm 22 includes two sliding elements 221. Each of the two sliding elements 221 projects from a sidewall of the first free end 220.

In the embodiment, the third receiving space 212 is rectangular. The third receiving space 212 is further located in middle of the first support arm 21 toward the second end 216 of the first support arm 21.

Figure 4:
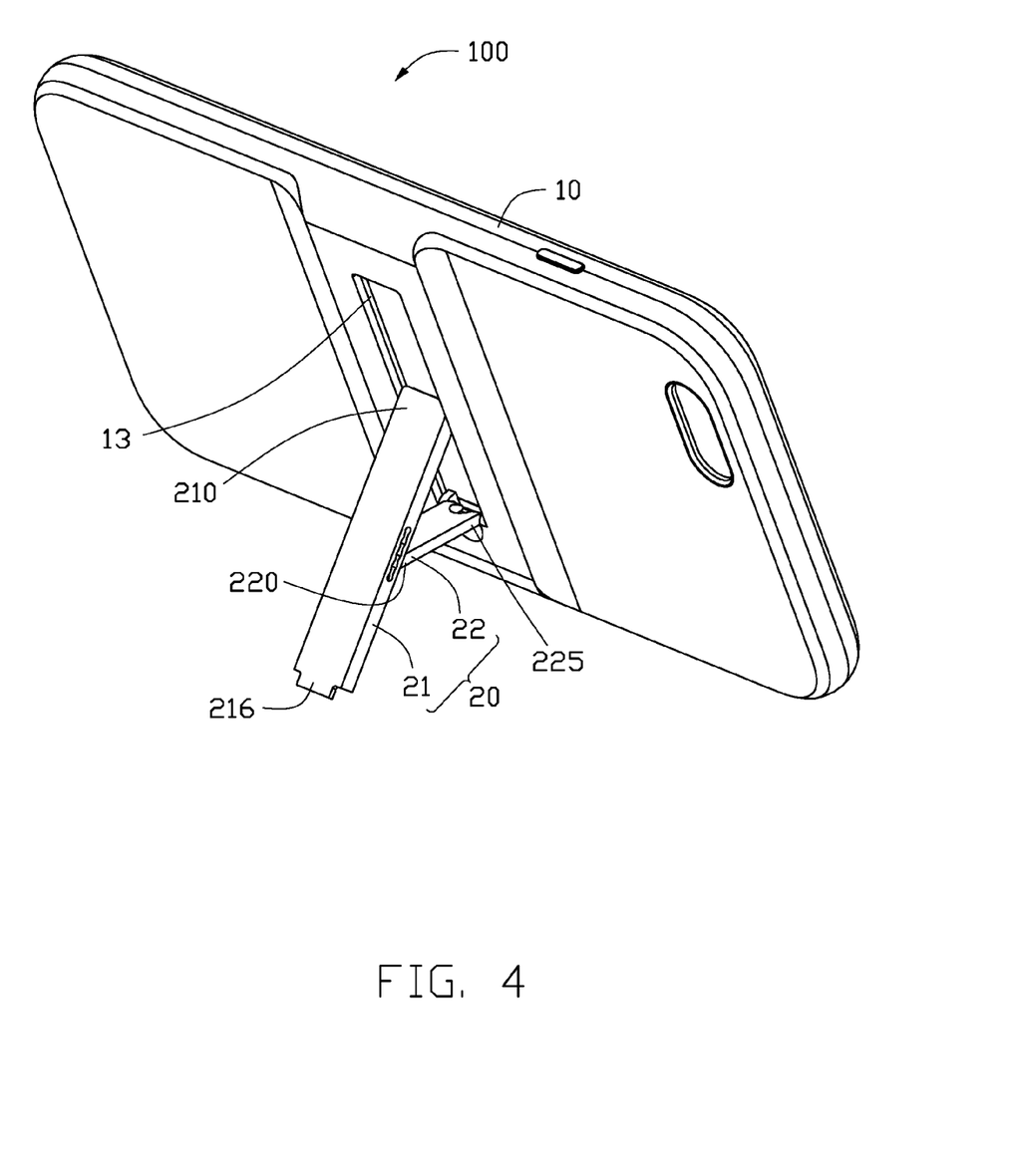
FIG. 4 is a diagrammatic view of the protective shell in a first usage state with a first support angle.

Each opposing sidewall of the third receiving space 212 includes one or more limiting holes 2121 corresponding to the sliding elements 221. The limiting holes 2121 can receive and limit the sliding elements 221. The sliding elements 221 can be rotatably received in the limiting holes 2121. FIGS. 4-5 respectively show the protective shell in usage states with different supporting angles; the first support arm 21 is pulled out of the second receiving space 12 to drive the second support arm 22 to rotate, adjusting an angle of the support element 20 supporting the shell body 10. In the embodiment, the angle of the support element 20 supporting the shell body 10 is adjustable according to how far the first support arm 21 is pulled out of the second receiving space 12 toward outside of the shell body 10.

In an alternative embodiment, the limiting holes 2121 on a same sidewall of the third receiving space 212 connect to each other, thus the sliding elements 221 can slide to different positions within the different parts of limiting holes 2121, and the support element 20 can thus support the shell body 10 in different angles. In one embodiment, the limiting holes 2121 on the same sidewall of the third receiving space 212 are arranged to resemble a string of beads.

To install the second support arm 22, the second support arm 22 is deformed, making the rotation elements 223 captive in the receiving holes 14 and the sliding elements 221 captive in the limiting holes 2121. In the embodiment, the second support arm 22 includes a first gap 222 in the first free end 220, and a second gap 224 in the second free end 225. The first gap 222 is located between the sliding elements 221. The second gap 224 is located between the rotation 223. The first gap 222 and the second gap 224 can make the first end 220 and the second end 225 more deformable, thus permitting easier installation of the first free end 220 of the second support arm 22 in the first support arm 21. Likewise for the second free end 225 of the second support arm 22 in the second receiving space 12. In the embodiment, the first gap 222 and the second gap 224 have the same shape, such as U-shaped, square-shaped, or semi-circle-shaped. In other embodiment, the first gap 222 and the second gap 224 can be other shape.

The second end 216 of the first support arm 21 includes one or more non-slip pads 213. The non-slip pad 213 can prevent the first support arm 21 from sliding along a support surface such as a desk surface while the first support arm 21 supports the electronic device received in the shell body 10. In other embodiment, the non-slip pad 213 can be a high-friction rubber sleeve, or other material with high-friction properties.

Referring to FIG. 3, the first support arm 21 includes one or more third gaps 215 on the first end 210 of the first support arm 21. The second receiving space 12 includes one more third projections 16 corresponding to the third gaps 215. The third projections 16 cooperate with the third gaps 215 to fix the support element 20 firmly on the shell body 10. In the embodiment, the first end 210 of the first support arm 21 is semicircular in section. The first support arm 21 includes two third gaps 215.

The protective shell 100 can be used as follows:

In an initial state, as shown in FIG. 2, the support element 20 is received in the second receiving space 12.

As shown in FIGS. 4-6, the first support arm 21 of the support element 20 is pulled out of the second receiving space 12 from the concave portion 15, toward the outside of the shell body 10. The sliders 211 of the first support arm 21 are driven to slide in the slide grooves 13 and the second support arm 22 is driven to rotate, forming an angle between the second support arm 22 and the first support arm 21. The shell body 10 can then be supported by the first support arm 21 and the second support arm 22 on a desk for example. The sliding elements 221 can further be received in different parts of the limiting holes 2121, changing the angle between the first support arm 21 and the second support arm 22. The electronic device received in the protective shell 100 can thus be supported at the support element 20 with different angles.

The embodiments shown and described above are only examples. Many details are often found in the art such as the other features of a protective shell. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. A protective shell for an electronic device, comprising:
    a shell body defining a first receiving space for receiving the electronic device and a second receiving space; and
    a support element arranged on the shell body and received in the second receiving space, the support element comprising:
        a first support arm defining a third receiving space and comprising:
            a first end slidably received in the second receiving space, and
            a second end configured to be pulled out of the second receiving space toward outside of the shell body; and
        a second support arm comprising:
            a first free end slidably received in the third receiving space and comprising two sliding elements respectively arranged on two sidewalls of the first free end; and
            a second free end opposite to the first free end and rotatably received in the second receiving space;
    wherein two opposite sidewalls of the third receiving space respectively defines at least one limiting hole for receiving and limiting one of the two sliding elements; and
    wherein a support angle of the support element to the shell body is adjustable according to how far the first support arm is pulled out of the second receiving space toward outside of the shell body.

2. The protective shell according to claim 1, wherein the second free end of the second support comprises two rotation elements opposite each other, the second receiving space comprises two receiving holes corresponding to the two rotation elements for receiving the two rotation elements, the two rotation elements are rotatably received in the receiving holes of the second receiving space.

3. The protective shell according to claim 1, wherein each of the two opposite sidewalls of the third receiving space comprises a plurality of limiting holes, the plurality of limiting holes connect each other; one of the two sliding elements is received and limited in one of the plurality of limiting holes.

4. The protective shell according to claim 1, wherein the third receiving space is rectangle shaped, and is located in middle of the first support arm toward the second end of the first support arm.

5. The protective shell according to claim 1, wherein each side wall of the second receiving space defines a slide groove, the first end of the first support arm comprises two sliders opposite each other, each slider is slidably received in the slide groove, which enables the first support arm to be pulled out of the second receiving space toward outside of the shell body while the sliders slide in the slide grooves.

6. The protective shell according to claim 1, wherein the shell body comprises a concave portion, the concave portion connects to the second receiving space and is configured to make it convenient for user to pull the first support arm out of the second receiving space.

7. The protective shell according to claim 1, wherein the first free end of the second support arm comprises a first gap which locates between the two sliding elements.

8. The protective shell according to claim 7, wherein the first gap is U shaped.

9. The protective shell according to claim 1, wherein the second free end of the second support arm comprises two rotation elements opposite each other and a second gap, the second gap is located between the two rotation elements.

10. The protective shell according to claim 9, wherein the second gap is U shaped.

11. The protective shell according to claim 1, wherein the first end of the first support arm comprises one or more third gaps; the second receiving space comprises one more third projections corresponding to the third gaps; the third projections cooperate with the third gaps, thereby the support element is fixedly arranged on the shell body while the first support arm is receiving in the second receiving space.

12. The protective shell according to claim 11, wherein the first end of the first support arm comprises two third gaps and the second receiving space comprises two projections.

13. The protective shell according to claim 1, wherein the first support arm comprises a non-slip pad which is arranged on the second end of the first support arm.

14. The protective shell according to claim 13, wherein the non-slip pad is a high-friction rubber sleeve or other material with high-friction properties.

15. The protective shell according to claim 1, wherein the shell body comprises an inner body and an outer body which partially covers the inner body.

16. The protective shell according to claim 15, wherein the inner body is made from an elastic material, and the outer body is made from a non-elastic material.

17. The protective shell according to claim 16, wherein the inner body is made from thermoplastic polyurethanes, thermoplastic elastomer, or polypropylene.

18. The protective shell according to claim 15, wherein the second receiving space passes through the outer body and is located in the inner body.

19. The protective shell according to claim 18, wherein the second receiving space defines a slide groove on each sidewall of the second receiving space; and the slide groove is formed on the outer body.

20. The protective shell according to claim 18, wherein the second receiving space defines a slide groove on each sidewall of the second receiving space; and the slide groove is formed on the inner body.

* * * * *